2,733,987

ABRASIVE ARTICLES AND METHOD OF MAKING THE SAME

Robert D. Gartrell, Ridgewood, N. J., and Harry A. Meyer and Ronald R. McVay, Fort Wayne, Ind., assignors to United States Rubber Company, New York, N. Y., a corporation of New Jersey No Drawing. Application February 26, 1953, Serial No. 339,164

6 Claims. (Cl. 51—298)

This invention relates to abrasive articles of any type such as grinding wheels, blocks, stones, hones, coated abrasive articles such as sandpaper, abrasive belts, abrasive cylinders, etc., and to the method of making the same. More particularly the invention relates to abrasive wheels which cause a lower temperature rise during grinding and which are significantly freer from burning or overheating. Still more particularly the invention relates to abrasive wheels which exhibit remarkable freedom from failure when rotated at extremely high speeds. In one aspect the invention relates to non-porous rubber-bonded abrasive wheels which remove metal at the same rate as previous wheels of this type yet run considerably cooler because of faster wheel wear with accompanying decreased heat build-up due to friction. In another aspect, the invention relates to improved abrasive articles, especially grinding wheels, of the type in which abrasive grains are bonded together with depolymerized rubber. In still another aspect, the invention relates to a greatly improved method of making abrasive articles, especially grinding wheels, from mixtures of abrasive grains and depolymerized rubber.

The present invention is based upon our discovery that many remarkable advantages are obtained by using ground corn cob in conjunction with the rubber or resin or rubber and resin commonly used in association with abrasive grains as a binding medium or coating medium therefor. Our invention can be practiced in many different ways and can be used not only for the production of grinding wheels wherein abrasive grains are bonded together with rubber, resin or mixtures of rubber and resin or for the manufacture of any other type of abrasive article which embodies abrasive grains intimately associated with, bonded together or coated with rubber, resin, or a mixture of rubber and resin, the bonding or coating medium being vulcanized when it comprises rubber and being cured when it comprises a thermosetting resin.

The size of the particles of ground corn cob used in our invention can vary widely. We prefer that they be not larger in size than the abrasive grains. Typically the ground corn cob has a particle size ranging from 40 mesh to 100 mesh.

By means of our invention we can produce abrasive articles which are commonly considered to be non-porous, i. e., which incorporate a negligible amount of voids or porosity, and which, due to the incorporation of ground corn cob in the bond, exhibit a freer, cool-cutting action which is highly advantageous in the particular industries where such grinding properties are required. In making this non-porous type of abrasive article, we simply form a uniform mixture of abrasive grain, unvulcanized rubber or rubber-like material, vulcanizing ingredients therefor, and ground corn cob. The rubber or rubber-like material can be either natural rubber or any vulcanizable synthetic elastomer. In addition to conventional vulcanizing ingredients for the rubber or rubber-like material, the mixture can embody other conventional compounding ingredients including softeners, anti-oxidants, retarders, activators, synthetic resins and fillers. Such an abrasive mixture can then be shaped into the desired article, for example a grinding wheel, and the shaped article can then be cured in any suitable manner known to the art of making rubber-bonded abrasive wheels or the like.

Example I

As an example of the manufacture of a non-porous abrasive wheel in accordance with the invention, we may use the following formulation:

| | Parts by weight |
|---|---|
| Abrasive grain | 100.00 |
| Smoked sheet natural rubber | 5.50 |
| Rubber softener | 0.14 |
| Accelerator | 0.07 |
| Sulfur | 2.75 |
| Ground corn cob | 2.66 |

The foregoing ingredients are mixed together in any suitable manner. The resulting mixture is shaped and cured at a temperature sufficient to effect vulcanization of the rubber. There is thus obtained a grinding wheel which is unusual in its cool-cutting action. The proportion of ground corn cob in the wheel can be varied widely but typically will range from 1 to 20% by volume of the entire formulation. As the proportion of ground corn cob is increased the same rate of metal removal is maintained as would be accomplished if the ground corn cob were omitted, yet the cutting action of the wheel obtained is increasingly cooler by reason of faster wheel wear which decreases the heat build-up due to friction.

In a preferred embodiment of our invention, porous abrasive wheels or the like are made by bonding abrasive grains with a mixture of depolymerized rubber and ground corn cob. In making abrasive articles of this type, the use of ground corn cob overcomes major production difficulties which have attended the manufacture of abrasive articles bonded with depolymerized rubber. In addition, abrasive wheels bonded with mixtures of depolymerized rubber and ground corn cob in accordance with our invention can be made much thinner than depolymerized rubber-bonded abrasive wheels made in accordance with prior art procedures. Such wheels could not previously be made commercially in thicknesses under one inch. By means of our invention it is easily possible to make depolymerized rubber-bonded wheels as thin as 1/16 inch.

With conventional depolymerized rubber-abrasive grain mixtures used in making grinding wheels, many difficulties arise. A major difficulty is that the mixture is sticky and it is extremely difficult and time-consuming to charge it into the molds in such a way as to give a uniform density. The material does not flow in such a way as to give a uniform balanced wheel unless a great deal of care is exerted in loading the mold and even with such care the number of rejects due to wheel imbalance is high. It is commercially impractical to make thin wheels from this mixture.

We have found that the foregoing difficulties are completely overcome in a simple and commercially feasible manner by incorporating ground corn cob with the depolymerized rubber-abrasive grain mixture. After having commingled the abrasive grains with the liquid depolymerized rubber and with the vulcanizing and other compounding ingredients for the depolymerized rubber, to the mixture we add a suitable proportion of ground corn cob and continue mixing until the ground corn cob is uniformly distributed. In addition to serving as a filler the ground corn cob exerts a remarkable action upon the mixture, converting the mixture from a sticky intractable mass into a free-flowing granular pourable mixture. In this mixture each abrasive grain is coated with a mixture of the depolymerized rubber, the ground corn cob, and the vulcanizing and other compounding ingredients. This granular mixture can be stored for prolonged periods of time without setting-up or caking. It can be uniformly loaded into a mold and leveled to insure good balance and uniform construction of the abrasive wheels or other articles made therefrom. Upon subjecting the molded mass to suitable conditions of heat and pressure the granular coated particles of the mixture are bonded together to give a bond characterized by its excellent uniformity and its high strength. The abrasive articles can be pre-cured in the mold for from 5 minutes to approximately 4 hours depending upon the mold size and relative amount of bond, i. e., the grade of the wheel being produced. A typical pre-cure in a heated mold for a wheel of size 6" outside diameter by ¼" thickness by ½" inside diameter is 10 minutes at 320° F. After the pre-cure, the wheels or other articles can be removed from the mold and finally cured by heating at an elevated temperature for a time sufficient to vulcanize the depolymerized rubber component.

In a particularly preferred embodiment of our invention, we make an abrasive wheel or the like in which abrasive grains are bonded with a cured mixture of depolymerized rubber, ground corn cob and a powdered thermosetting phenol-aldehyde resin. The powdered phenol-aldehyde resin used in such mixtures can replace a considerable portion of the ground corn cob although it cannot entirely replace the ground corn cob. The amount of the phenol-aldehyde resin can range from 0% upwardly to 90% by volume based upon the sum of the ground corn cob and the resin.

The volume ratio of the amount of ground corn cob or of ground corn cob plus powdered resin to the depolymerized rubber will typically range from 3:1 to 4:1.

The incorporation of the above-mentioned phenol-aldehyde resin in the abrasive grain-depolymerized rubber-ground corn cob mixture is particularly advantageous because it materially increases the strength and resistance to wear of the abrasive articles.

In this aspect of our invention, we can use any powdered thermosetting phenol-aldehyde resin, typically a condensation product of phenol and formaldehyde. It may be either a straight phenol-aldehyde resin or a modified resin.

The relative proportions of depolymerized rubber, ground corn cob and phenolic resin can vary widely without departing from our inventive concept. However, we will typically employ from 4 to 15% by volume of depolymerized rubber, from 1 to 50% by volume of ground corn cob and from 0 to 40% by volume of the powdered phenolic resin, these percentages being based upon the volume of the abrasive mixture prior to molding.

*Example II*

As an example of an abrasive article made in accordance with this aspect of our invention, we employ abrasive, thermosetting phenolic resin, ground corn cob, depolymerized rubber, and vulcanizing agents therefor in the following proportions:

| | Parts by weight |
|---|---|
| Abrasive grain | 100.00 |
| Depolymerized rubber | 3.52 |
| Accelerator | 0.05 |
| Sulfur | 1.77 |
| Thermosetting phenol-formaldehyde resin | 8.42 |
| Ground corn cob | 7.47 |

To an intimate mixture of the abrasive grain, depolymerized rubber, accelerator, sulfur and ground corn cob, the powdered resin was added and intimately incorporated. The resulting mixture was poured into a mold having the shape of a wheel, pre-cured, removed from the mold and finally cured in the manner described above. The resulting wheel was ideally suited for grinding stainless steel.

When we use both ground corn cob and powdered phenolic resin, we usually add the corn cob to the sticky abrasive-depolymerized rubber mixture in amount insufficient to remove its stickiness and then complete the conversion to pourable granular form by adding the powdered phenolic resin.

The results of our invention cannot be achieved if ground corn cob is completely eliminated from the depolymerized rubber-abrasive mixtures. In other words, it is not possible to use powdered phenol-aldehyde resin alone to effect conversion to the granular pourable mixture described above.

The granular abrasive mixture described above, i. e., the mixture of abrasive grain, depolymerized rubber, vulcanizing agents, and ground corn cob or mixtures of ground corn cob and powdered phenol-aldehyde resin, can be used in the manufacture of coated abrasive articles such as sandpaper, abrasive cylinders such as for example those used in potato peeling machines, abrasive belts, etc. Any type of backing can be used. For example in the case of sandpaper or abrasive belts the backing may be of rubber, cloth or paper. In making coated abrasive articles of the type just discussed, an intermediate bonding medium of any suitable type, such as resin or cement, will generally be employed to adhere the coated abrasive granules to the carrier or backing.

From the foregoing description many advantages of our invention will be apparent to those skilled in the art. An important advantage is that the presence of the ground corn cob gives an abrasive structure which does not heat up. This is especially advantageous in the case of abrasive wheels used in the stainless steel fabrication industry where excessive heating causes burning or discoloration of the metal being ground. Our invention is particularly advantageous in the case of depolymerized rubber-containing abrasive mixtures since, as explained above, the ground corn cob converts the prior art depolymerized rubber-containing abrasive mixture, which is extremely difficult to work with and to load into the molds, into a granular free-pouring mixture which is highly conducive to easy mold loading and leveling and therefore effects a marked decrease in labor for loading and leveling and gives wheels characterized by their excellent balance, uniform bond dispersion, uniform grain dispersion, and uniform porosity dispersion. Numerous other advantages of our invention will be apparent to those skilled in the art from the foregoing description.

Ranges of proportions are given herein by volume, while the examples refer to parts by weight, this being in accordance with accepted abrasive compounding practice. Those skilled in the art can readily determine volume proportions from parts by weight and vice versa.

By "liquid depolymerized rubber" as used in this specification and in the claims, we mean rubber which has been depolymerized in known manner to such an extent that it is inately and by itself liquid.

Having thus described our invention, what we claim and desire to protect by Letters Patent is:

1. An abrasive article comprising abrasive grains in intimate association with a vulcanized mixture comprising liquid depolymerized rubber, vulcanizing ingredients therefor, and ground corn cob, said depolymerized rubber being employed in amount equal to from 4 to 15% and said ground corn cob being employed in amount equal to from 1 to 50%, said percentages being by volume based on the volume of the entire formulation before molding.

2. An abrasive wheel comprising abrasive grains bonded with a vulcanized mixture of liquid depolymerized rubber, vulcanizing ingredients therefor, and ground corn cob, said depolymerized rubber being employed in amount equal to from 4 to 15% and said ground corn cob being employed in amount equal to from 1 to 50%, said percentages being by volume based on the volume of the entire formulation before molding.

3. An abrasive article comprising abrasive grains in intimate association with a cured mixture of liquid depolymerized rubber, vulcanizing ingredients therefor, a thermosetting phenolaldehyde resin, and ground corn cob, said depolymerized rubber being employed in amount equal to from 4 to 15%, said ground corn cob being employed in amount equal to from 1 to 50%, said resin being employed in amount up to 40%, said percentages being by volume based upon the volume of the entire formulation before molding, the volume ratio of said ground corn cob and said resin to said depolymerized rubber being equal to from 3:1 to 4:1.

4. An abrasive wheel comprising abrasive grains bonded with a cured mixture of liquid depolymerized rubber, vulcanizing ingredients therefor, a thermosetting phenolaldehyde resin, and ground corn cob, said depolymerized rubber being employed in amount equal to from 4 to 15%, said ground corn cob being employed in amount equal to from 1 to 50%, said resin being employed in amount up to 40%, said percentages being by volume based upon the volume of the entire formulation before molding, the volume ratio of said ground corn cob and said resin to said depolymerized rubber being equal to from 3:1 to 4:1.

5. The method of making an abrasive article which comprises forming a sticky mixture of abrasive grains, liquid depolymerized rubber, and vulcanizing ingredients therefor, incorporating ground corn cob with the resulting mixture and thereby converting it to pourable, granular, non-sticky form, shaping the resulting mixture, and curing the shaped mixture, said depolymerized rubber being employed in amount equal to from 4 to 15% and said ground corn cob being employed in amount equal to from 1 to 50%, said percentages being by volume based on the volume of the entire formulation before molding.

6. The method of making an abrasive article which comprises forming a sticky mixture of abrasive grains, liquid depolymerized rubber, and vulcanizing ingredients therefor, incorporating ground corn cob with the resulting mixture, incorporating a powdered thermosetting phenol-aldehyde resin with the mixture, the incorporation of said corn cob and said resin converting the mixture to pourable, granular, non-sticky form, shaping the resulting mixture, and curing the shaped mixture, said depolymerized rubber being employed in amount equal to from 4 to 15%, said ground corn cob being employed in amount equal to from 1 to 50%, said resin being employed in amount up to 40%, said percentages being by volume based upon the volume of the entire formulation before molding, the volume ratio of said ground corn cob and said resin to said depolymerized rubber being equal to from 3:1 to 4:1.

References Cited in the file of this patent

UNITED STATES PATENTS

| Number | Name | Date |
|---|---|---|
| 1,598,328 | Truax | Aug. 31, 1926 |
| 1,655,396 | Webster | Jan. 3, 1929 |
| 1,990,737 | Kuzmick et al. | Feb. 12, 1935 |
| 2,319,182 | Van der Pyl | May 11, 1943 |
| 2,412,599 | Buell | Dec. 17, 1946 |
| 2,701,191 | Laliberte | Feb. 1, 1955 |